(12) United States Patent
Chen et al.

(10) Patent No.: US 9,632,538 B2
(45) Date of Patent: Apr. 25, 2017

(54) POSITIONING FRAME FOR A TOUCH PAD FILM AND METHOD FOR ADHERING A FILM TO A TOUCH PAD

(71) Applicant: Quanta Computer Inc., Taoyuan Shien (TW)

(72) Inventors: Chung-Kai Chen, New Taipei (TW); Chen Tseng, Kaohsiung (TW)

(73) Assignee: Quanta Computer Inc., Guishan Dist., Taoyuan (TW)

( * ) Notice: Subject to any disclaimer, the term of this patent is extended or adjusted under 35 U.S.C. 154(b) by 139 days.

(21) Appl. No.: 14/274,264

(22) Filed: May 9, 2014

(65) Prior Publication Data

US 2015/0160692 A1 Jun. 11, 2015

(30) Foreign Application Priority Data

Dec. 5, 2013 (TW) .............................. 102144597 A (51) Int. Cl.
*B25B 1/22* (2006.01)
*G06F 1/16* (2006.01)

(52) U.S. Cl.
CPC .......... *G06F 1/1643* (2013.01); *G06F 1/1637* (2013.01); *G06F 2203/04103* (2013.01); *Y10T 29/49895* (2015.01)

(58) Field of Classification Search
CPC . B25B 27/00; B25B 27/0028; B25B 27/0035; B25B 27/0042; B25B 27/02; B25B 27/06
See application file for complete search history.

(56) References Cited

U.S. PATENT DOCUMENTS

| | | | | |
|---|---|---|---|---|
| 4,436,356 A | * | 3/1984 | Stelling | H05B 6/6402 108/93 |
| 4,993,895 A | * | 2/1991 | Nordstrom | B23B 49/00 269/287 |
| 6,386,531 B1 | * | 5/2002 | Prosser | A47J 47/005 269/15 |
| 2004/0207140 A1 | * | 10/2004 | Johnson | A47J 47/005 269/289 R |
| 2009/0084705 A1 | * | 4/2009 | Justiss | A45F 5/02 206/724 |
| 2009/0200723 A1 | * | 8/2009 | Lim | A47J 47/005 269/289 R |
| 2015/0160692 A1 | * | 6/2015 | Chen | G06F 1/1643 29/464 |

* cited by examiner

*Primary Examiner* — Lee D Wilson
(74) *Attorney, Agent, or Firm* — Rabin & Berdo, P.C.

(57) ABSTRACT

The disclosure provides a positioning frame for a touch pad. The positioning frame includes a main frame and a positioning wall. The positioning wall is located at a side of the main frame and is connected to the main frame. An inner surface of the main frame and the positioning wall define an opening. An area of the opening is approximately the same as an area of a film to be adhered to the touch pad. The positioning wall is configured to insert into a gap between the touch pad and a front cover of a system body.

6 Claims, 10 Drawing Sheets

POSITIONING FRAME FOR A TOUCH PAD FILM AND METHOD FOR ADHERING A FILM TO A TOUCH PAD

RELATED APPLICATIONS

This application claims priority to Taiwan Application Serial Number 102144597, filed Dec. 5, 2013, which is herein incorporated by reference.

BACKGROUND

Technical Field

The present disclosure relates to a positioning frame. More particularly, the present disclosure relates to a positioning frame for a touch pad film.

Description of Related Art

During assembly of a touch pad of a notebook computer, a film is adhered to an upper surface of the touch pad to enhance comfort while using the touch pad. However, when adhering the film, the film may be shifted due to variations in physical dimensions of a front cover or a fixing bracket as a result of these elements having an engineering tolerance. As a result, not only the appearance negatively being affected, but also the shifting of the film. Such that, it interferes with the front cover. Consequently, the touch pad may sense incorrectly or may even be unable to sense a touch force.

Additionally, the touch pad is assembled from a back surface of the front cover of the system (i.e., inside of a case). When the film is shifted, the assembly worker is not aware that such shifting has taken place. That is, the assembly worker must determine whether the film has shifted by checking from the front surface of the system. Ultimately, this increases labor costs.

SUMMARY

The disclosure provides a positioning frame for a touch pad. The positioning frame includes a main frame and a positioning wall. The positioning wall is located at a side of the main frame and is connected to the main frame. An inner surface of the main frame and the positioning wall define an opening. An area of the opening is approximately the same as an area of a film to be adhered to the touch pad. The positioning wall is configured to insert into a gap between the touch pad and a front cover of a system body.

The present disclosure further provides a method for adhering a film to a touch pad including the following steps: (A) adhering a fixing bracket to a back surface of a touch pad; (B) aligning a plurality of screw holes of the fixing bracket with a plurality of the screw holes of a front cover of a system body, respectively, and connecting the fixing bracket and the front cover of the system body using screws or bolts that engage the screw holes; (C) inserting a positioning wall of a positioning frame into a gap between the touch pad and the front cover of the system body from a front surface of the touch pad; (D) aligning a film with an opening of the positioning frame, and adhering the film to the front surface of the touch pad; and (E) removing the positioning frame from the front surface of the touch pad.

Accordingly, through the positioning frame and method for adhering a film to a touch pad of this disclosure, the film is constrained on the front surface of the touch pad, so as to solve the prior art problems caused by variations in physical dimensions due to the tolerance of elements. In addition, the assembly worker can see the front surface of the front cover of the system body and the front surface of the touch pad during assembly. When the assembly worker adheres the film inaccurately, the assembly worker can easily notice this fact, and then proceed to rectify the situation. In addition, the positioning frame of this disclosure may be manufactured cheaply, and is effective in assembling the touch pad. Finally, the positioning frame and method for adhering a film to a touch pad and the positioning frame of this disclosure can be used in an automatic manufacturing process, so as to minimize labor costs.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In order to solve the problem of shifting of a film during assembly of a conventional touch pad, the present disclosure provides a positioning frame that is able to effectively solve this problem.

Figure 1:
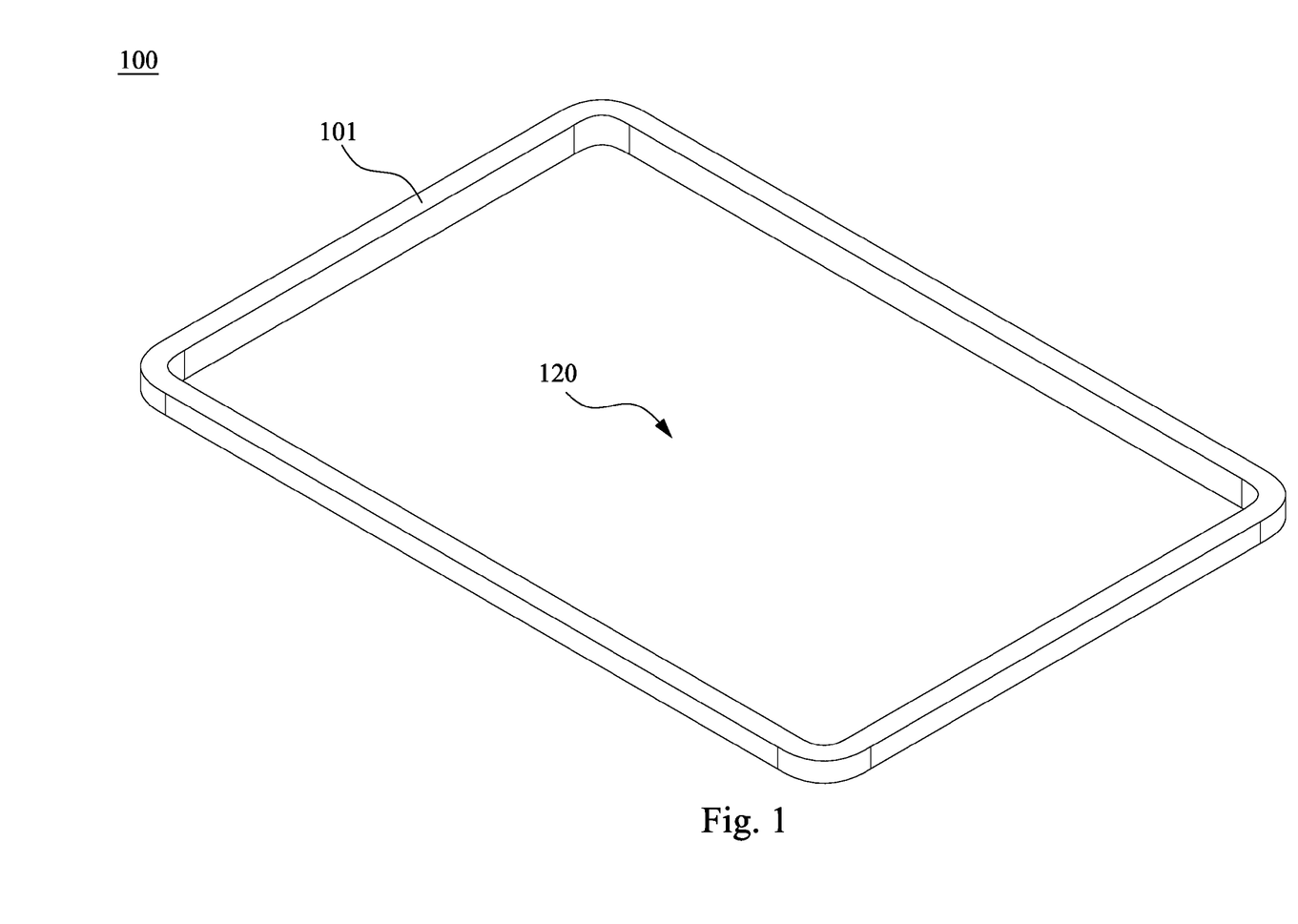
FIG. 1 is a top view of a positioning frame according to an embodiment of the present disclosure.
Figure 2:
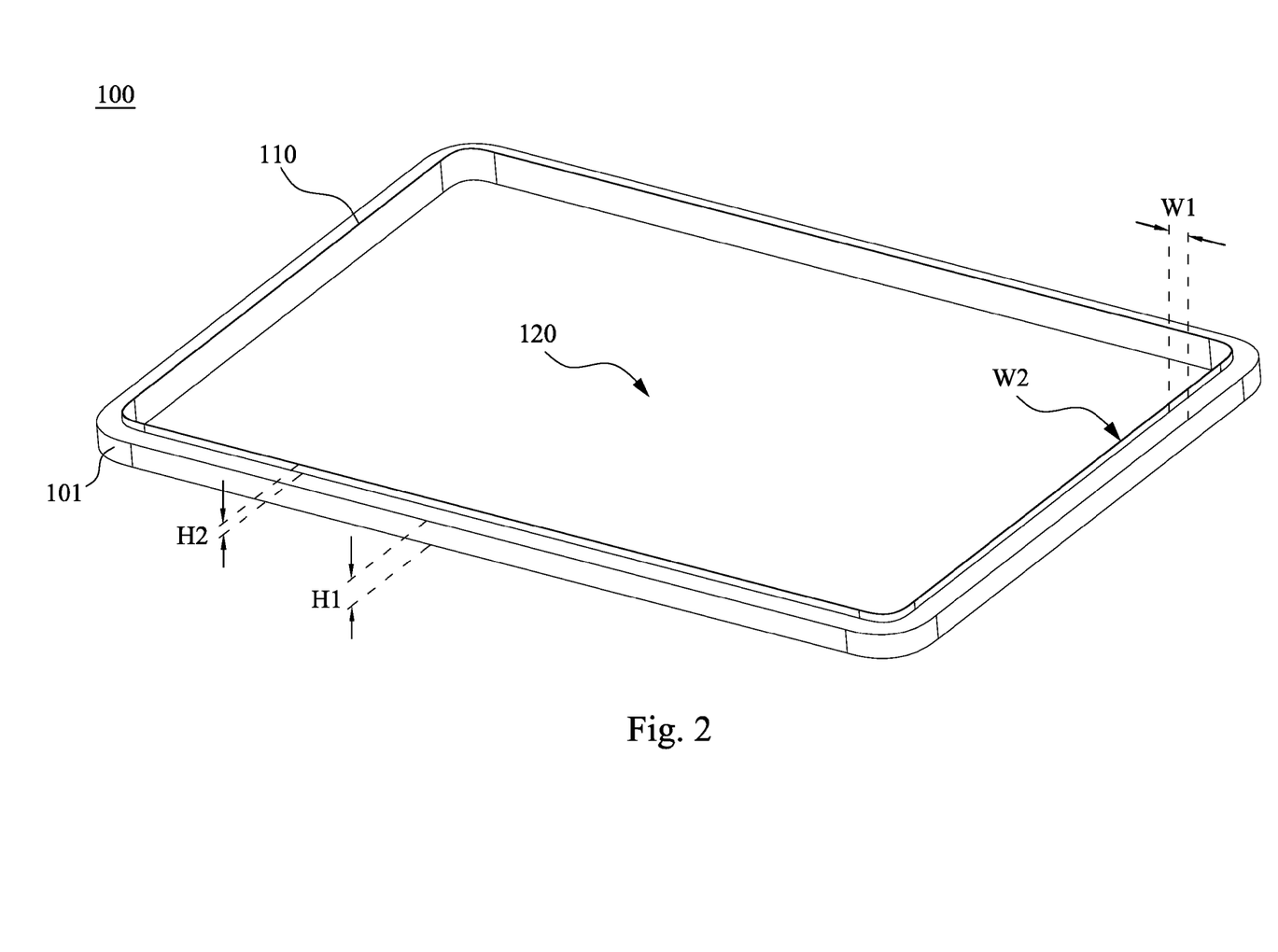
FIG. 2 is a bottom view of the positioning frame in FIG. 1.

FIG. 1 is a top view of a positioning frame 100 according to an embodiment of the present disclosure. FIG. 2 is a bottom view of the positioning frame 100 in FIG. 1. The present disclosure provides the positioning frame 100 for a touch pad. The positioning frame 100 includes a main frame 101 and a positioning wall 110. The positioning wall 110 is at one side of the main frame 101 and is connected with the main frame 101. The main frame 101 and the positioning wall 110 are provided in a surrounding configuration to define an opening 120. In an embodiment of the present disclosure, the main frame 101 is rectangular. In an embodiment of the present disclosure, the positioning wall 110 is rectangular. In an embodiment of the present disclosure, the main frame 101 and the positioning wall 110 are made of metal. In a preferred embodiment of the present disclosure, a thickness W2 of the positioning wall 110 is less than 0.2 mm, thus, the positioning wall 110 must be formed of a material that is highly malleable and structurally strong. In an embodiment of the present disclosure, the main frame 101 has a uniform height H1. In an embodiment of the present disclosure, the positioning wall 110 has another uniform height H2. In an embodiment of the present disclosure, a thickness W1 of the main frame 101 is greater than the thickness W2 of the positioning wall 110.

Figure 3:
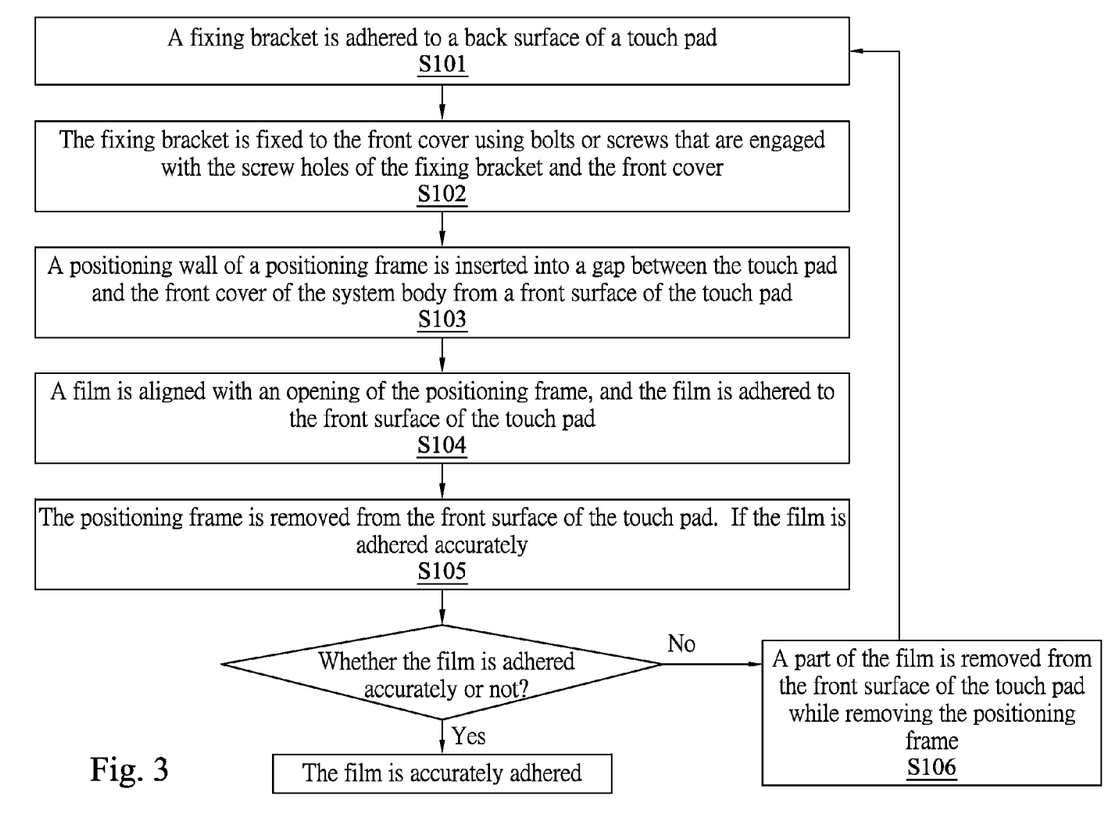
FIG. 3 is a flow chart of a method for adhering a film to a touch pad according to an embodiment of the present disclosure.

FIG. 3 is a flow chart of a method for adhering a film to a touch pad according to an embodiment of the present disclosure. The present disclosure provides a method for adhering a film to a touch pad that includes steps S103-S106.

In step S101, a fixing bracket is adhered to a back surface of a touch pad (i.e., a surface that a computer user cannot reach).

In step S102, a plurality of screw holes of the fixing bracket are aligned respectively with a plurality of screw holes of a back surface of a front cover of a system body, and the fixing bracket is fixed to the back surface of the front cover using bolts or screws that are engaged with the screw holes of the fixing bracket and the front cover.

In step S103, a positioning wall of a positioning frame is inserted into a gap between the touch pad and the front cover of the system body from a front surface of the touch pad (i.e., a surface that a computer user can reach).

In step S104, a film is aligned with an opening of the positioning frame, and the film is adhered to the front surface of the touch pad.

In step S105, the positioning frame is removed from the front surface of the touch pad. If the film is adhered accurately (e.g., the film is aligned to be adhered to the opening of the front surface of the touch pad), a process of adhering the film to the touch pad is finished. If the film is not adhered accurately, then the process proceeds to step S106, in which a part of the film is removed from the front surface of the touch pad while removing the positioning frame. Consequently, an assembly worker can remove the remainder of the film easily, after which the assembly worker performs step S101 to s105 again. Such a process is repeated as many times as necessary until the film is accurately adhered.

Figure 4:
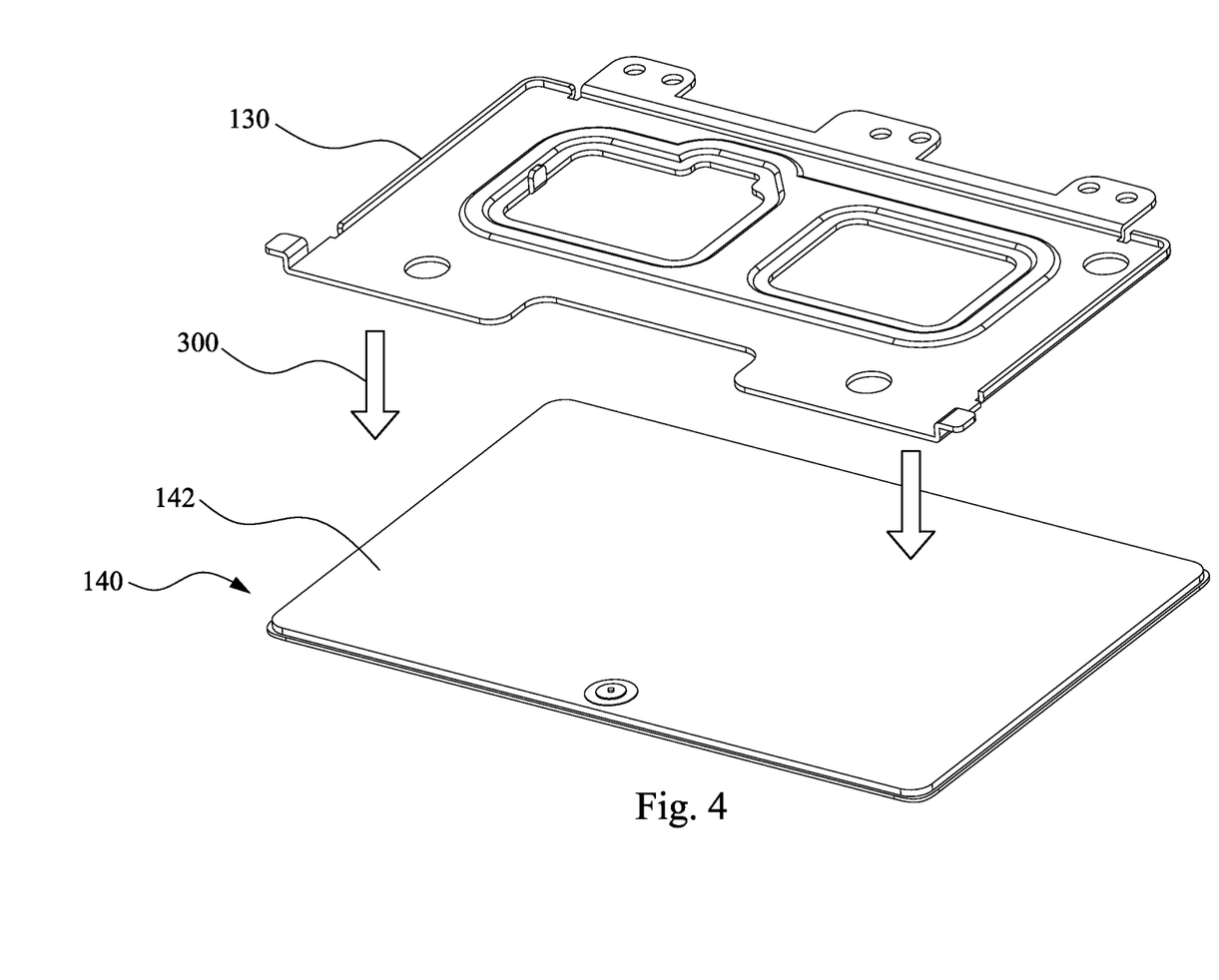
FIG. 4 is a bottom view of a fixing bracket and a touch pad according to an embodiment of the present disclosure.

FIG. 4 is a bottom view of a fixing bracket 130 and a touch pad 140 according to an embodiment of the present disclosure. Referring to FIG. 3 and FIG. 4, in step S101, the assembly worker aligns a fixing bracket 130 with a back surface 142 of a touch pad 140, moves the fixing bracket 130 along a direction 300, then adheres the fixing bracket to the back surface 142 of the touch pad 140. The assembly worker may use a sticky film to adhere the fixing bracket 130 to the touch pad 140, thereby allowing for convenient assembly.

Figure 5:
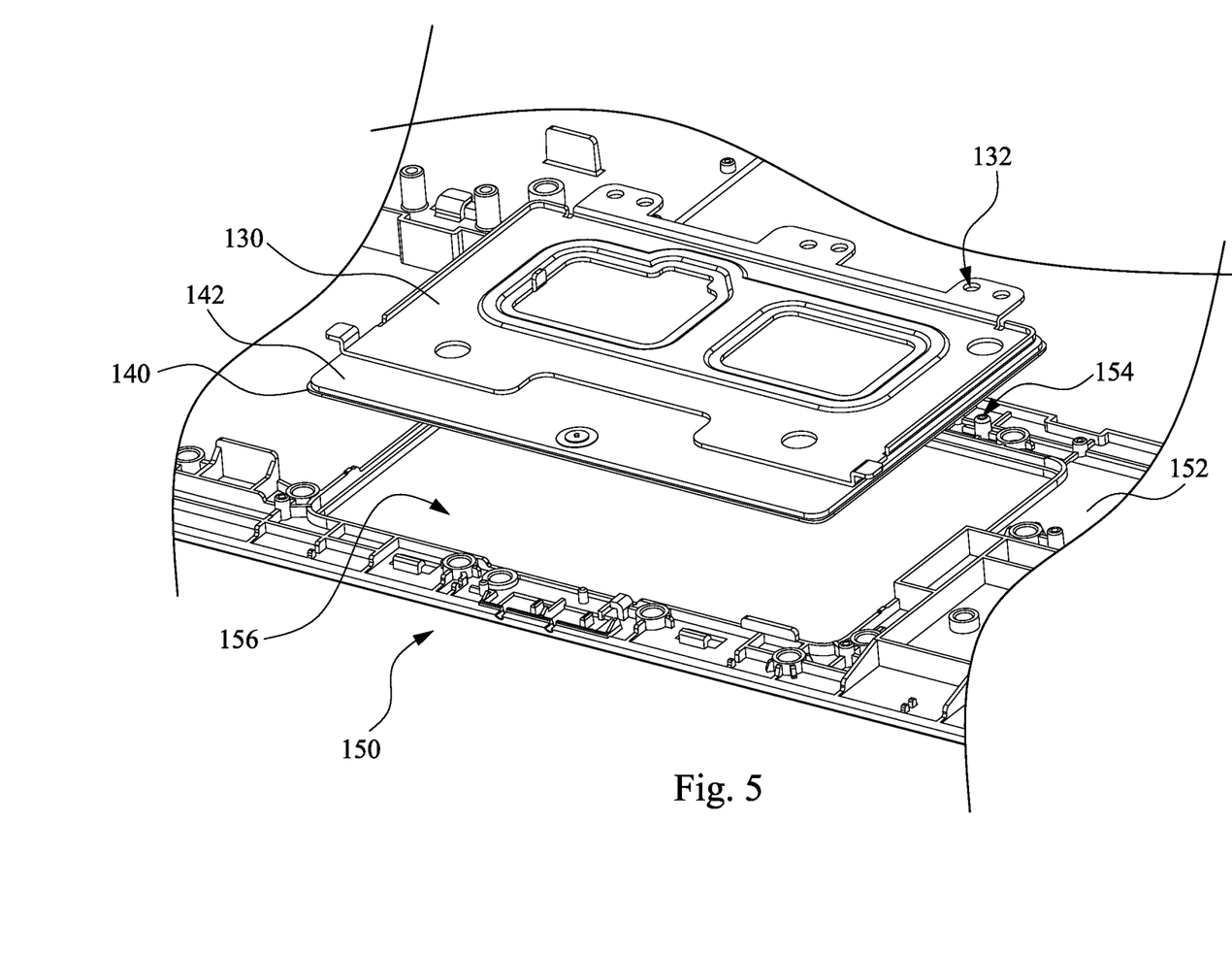
FIG. 5 is a bottom view of a front cover of a system body, the fixing bracket, and the touch pad according to an embodiment of the present disclosure.

FIG. 5 is a bottom view of a front cover of a system body 150, the fixing bracket 130, and the touch pad 140 according to an embodiment of the present disclosure. With reference to FIG. 3 and FIG. 5, after the fixing bracket 130 is adhered to the back surface 142 of the touch pad 140, the assembly worker aligns a plurality of the screw holes 132 of the fixing bracket 130 with a plurality of the screw holes 154 of the back surface 152 of the front cover of the system body 150, and the fixing bracket 130 is fixed to the front cover of the system body 150 using bolts or screws that are engaged with the screw holes of the fixing bracket 130 and the front cover. As a result, the fixing bracket 130 and the touch pad 140 are fixed on the back surface 152 of the front cover of the system body 150 and are aligned with an opening 156. During the adhering process of step S101 and the fastening process of step S102, the fixing bracket 130 and the touch pad 140 may be shifted due to variations in physical dimensions resulting from tolerances of different devices. However, the method for adhering a film to a touch pad according to an embodiment of the present disclosure can overcome the problem of shifting by the steps described in the following paragraph.

Figure 6:
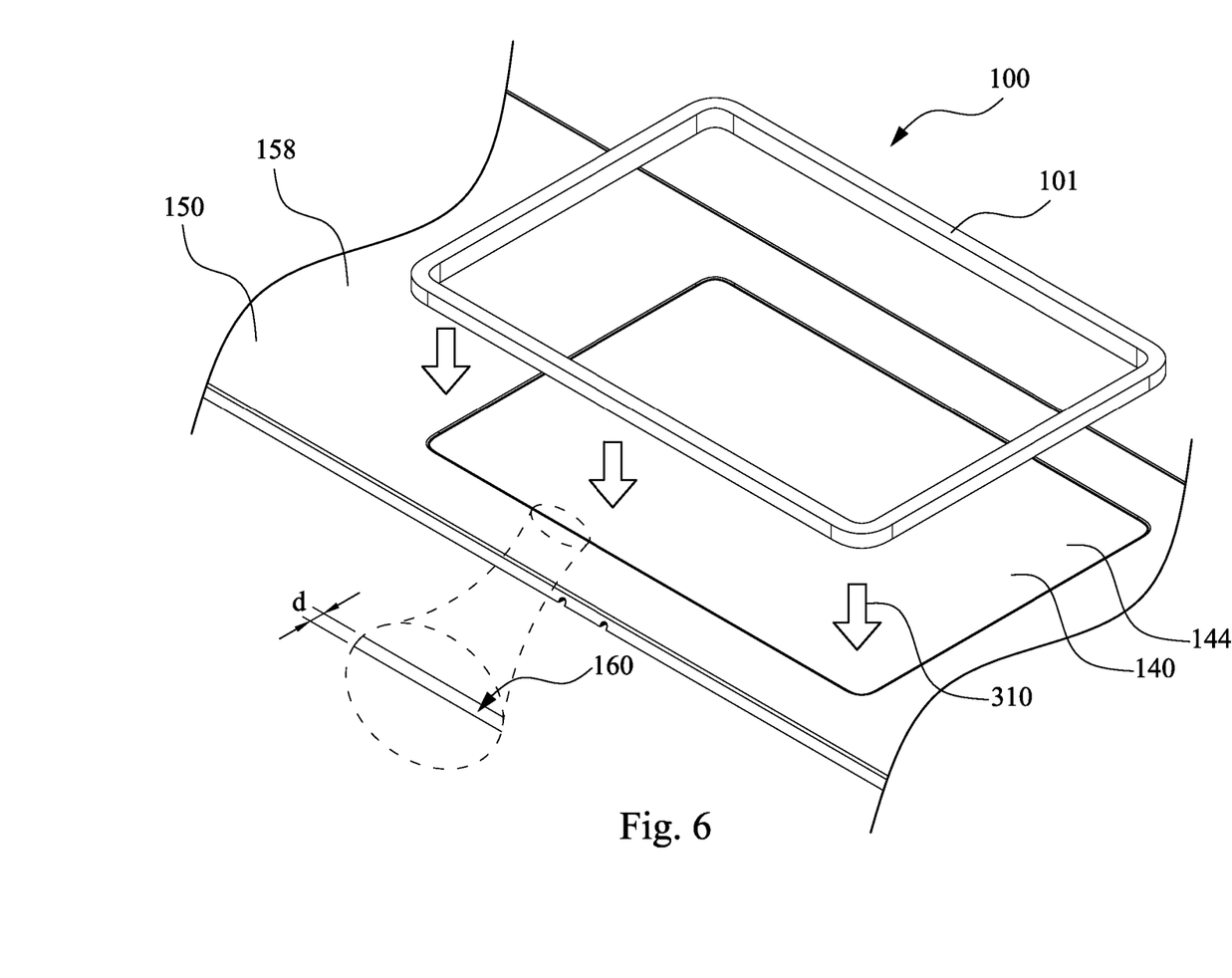
FIG. 6 is a top view of the positioning frame, the front cover of the system body, and the touch pad according to an embodiment of the present disclosure.

FIG. 6 is a top view of the positioning frame 100, the front cover of the system body 150, and the touch pad 140 according to an embodiment of the present disclosure. After the fixing bracket 130 and the touch pad 140 are fixed on the back surface 152 of the front cover of the system body 150, the assembly worker turns over the front cover of the system body 150, such that the assembly worker can see a front surface 158 of the front cover of the system body 150 and a front surface 144 of the touch pad 140. At this time, the assembly worker inserts the positioning wall 110 (see FIG. 2) into a gap 160 between the front surface 144 of the touch pad 140 and the front cover of the system body 150 by moving the positioning frame 100 along a direction 310. The gap 160 has a width d, and the thickness W2 of the positioning wall 110 (see FIG. 2) is less than the width d of the gap 160, such that the positioning wall 110 can be inserted into the gap 160.

Figure 7:
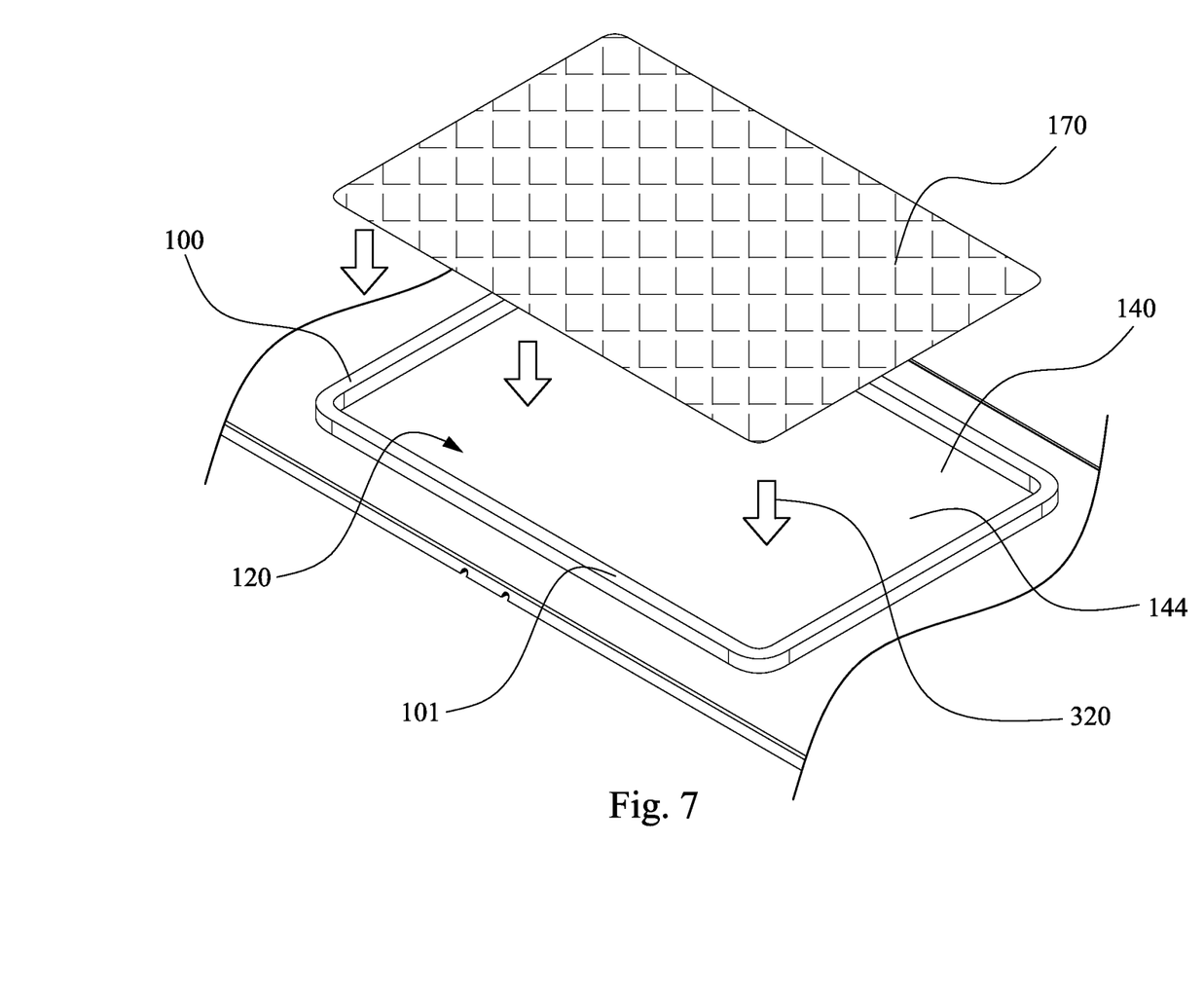
FIG. 7 is a schematic diagram before a film is adhered to the touch pad according to an embodiment of the present disclosure.

FIG. 7 is a schematic diagram before a film 170 is adhered to the touch pad 140 according to an embodiment of the present disclosure. Referring first to FIG. 7, after the positioning wall 110 (see FIG. 2) is inserted into the gap 160 surrounding the touch pad 140, the assembly worker aligns a film 170 with the opening 120 of the positioning frame 100, and subsequently moves the film 170 along a direction 320 then adheres the film 170 to the front surface 144 of the touch pad 140. The opening 120 is defined and surrounded by an inner surface of the main frame 101 and the positioning wall 110 (see FIG. 2). The opening 120 has an area, and the area is approximately the same as an area of the film 170, such that the film 170 is restricted within the opening 120.

Figure 8:
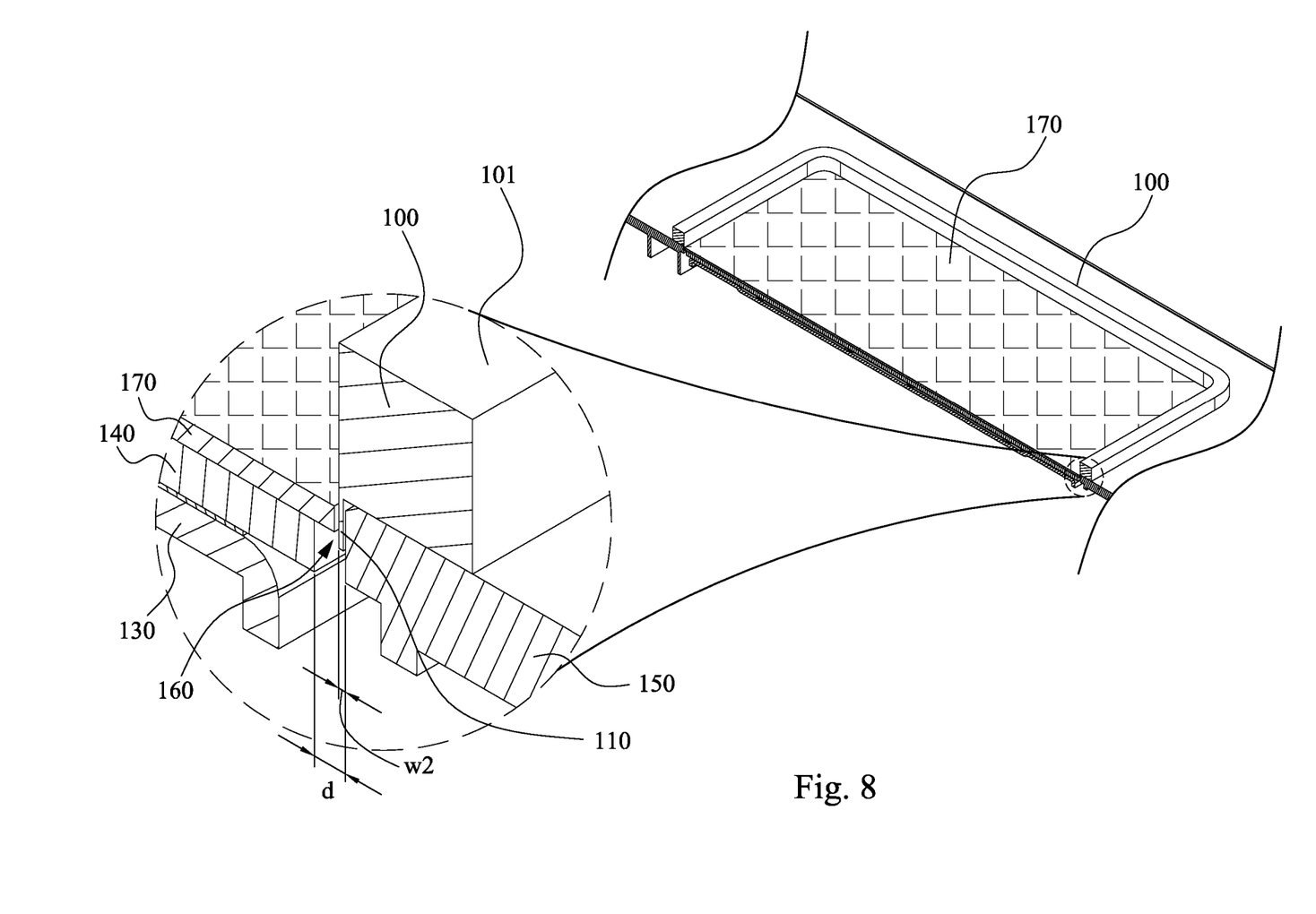
FIG. 8 is a cross-sectional view of the film, the positioning frame, the front cover of the system body, and the touch pad according to an embodiment of the present disclosure.

FIG. 8 is a cross-sectional view of the film 170, the positioning frame 100, the front cover of the system body 150, and the touch pad 140 according to an embodiment of the present disclosure. Because the positioning wall 110 is inserted into the gap 160 surrounding the touch pad 140, even if the fixing bracket 130 and the touch pad 140 are shifted after assembly, the film 170 remains aligned with and adhered to the front surface 144 of the touch pad 140 and does not become adhered to the front cover of the system body 150. Moreover, the method for adhering a film to a touch pad of this disclosure involves turning over the front cover of the system body 150, such that the assembly worker can see the front surface 158 of the front cover of the system body 150 and the front surface 144 of the touch pad 140. Accordingly, if the assembly worker adheres the film 170 inaccurately, the assembly worker can be aware of this fact and can immediately proceed to re-adhere the film 170.

Figure 9:
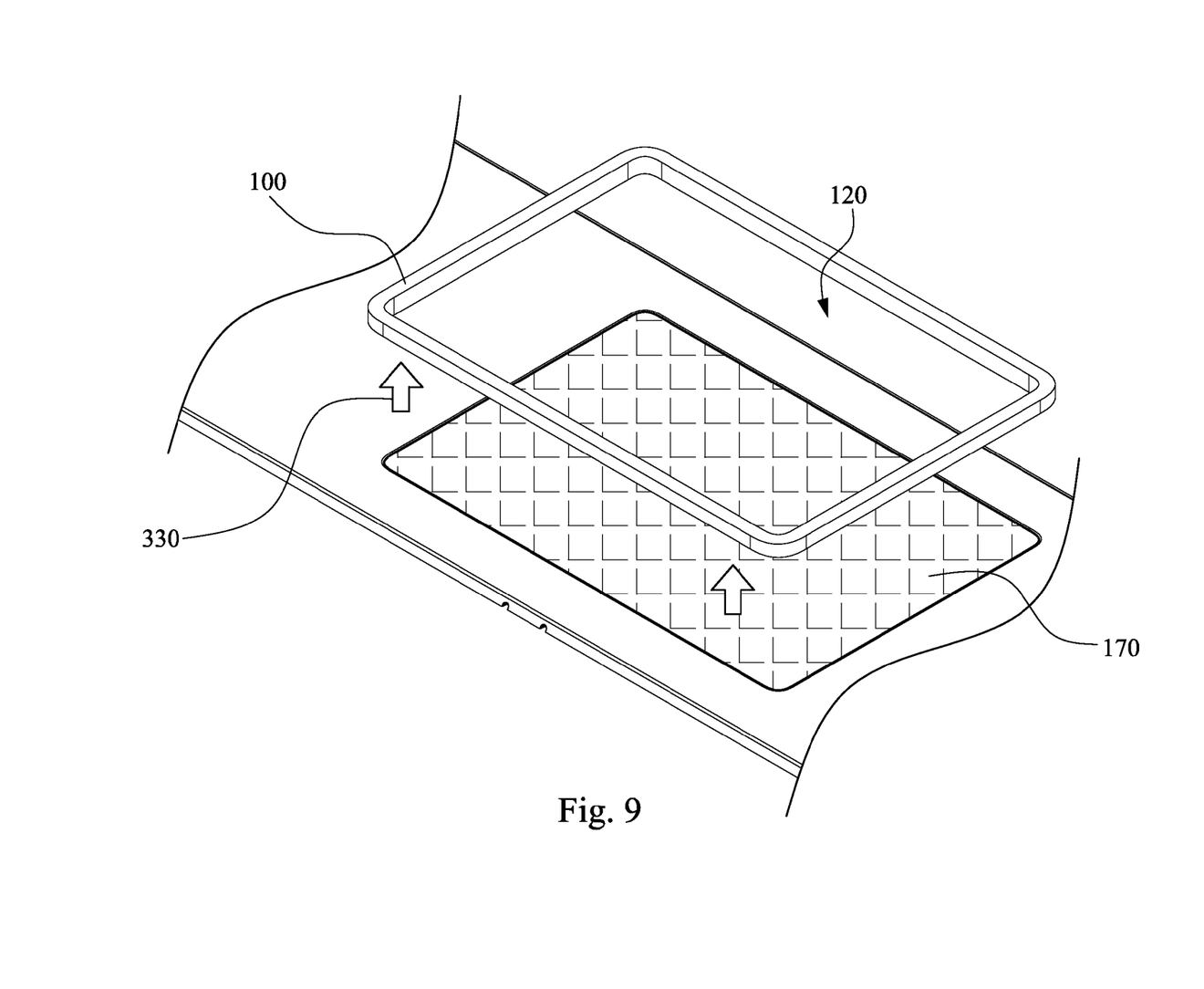
FIG. 9 is a schematic diagram after the film is adhered to the touch pad according to an embodiment of the present disclosure.
Figure 10:
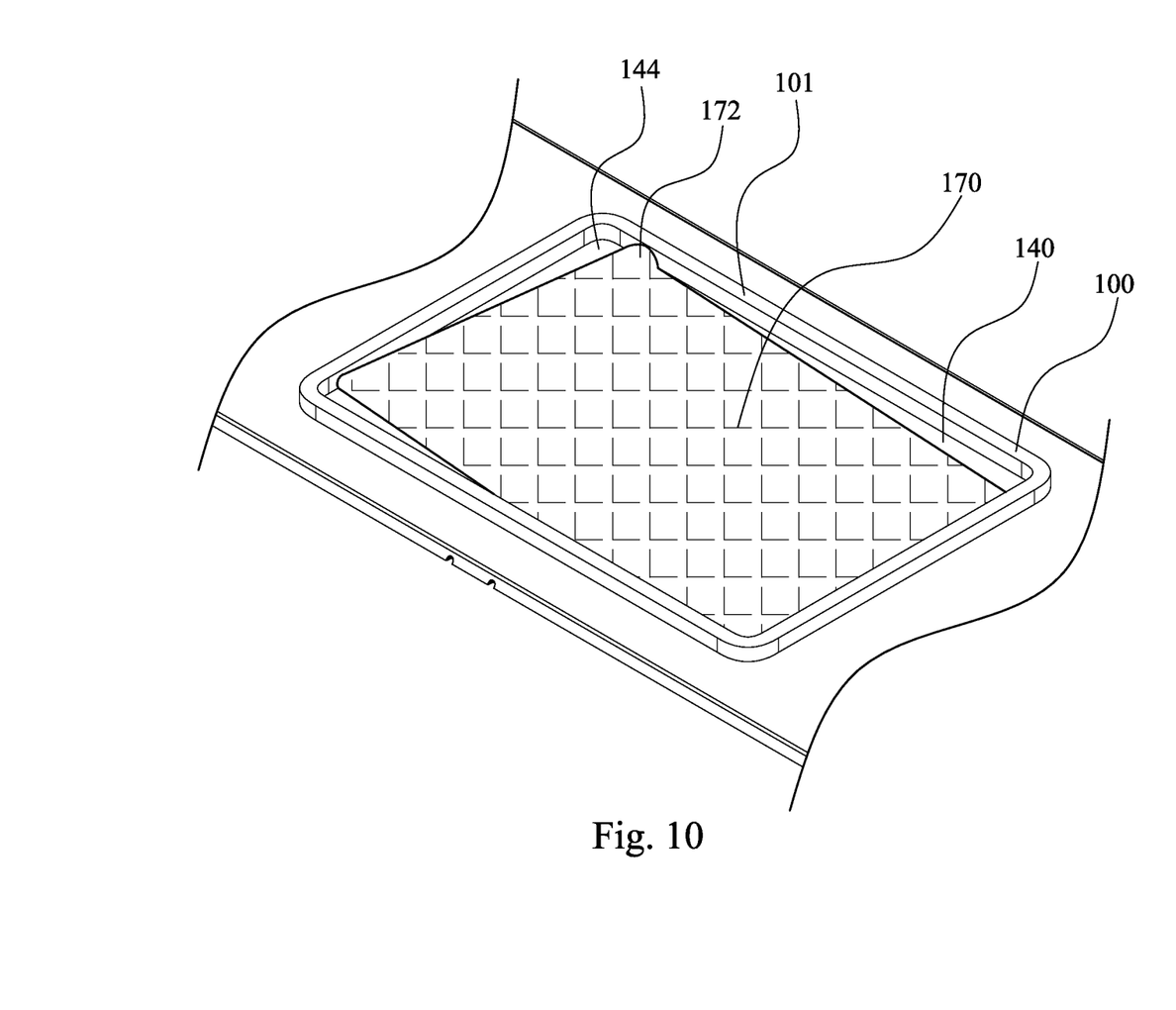
FIG. 10 is a schematic diagram showing a situation in which the film is adhered inaccurately according to an embodiment of the present disclosure.

FIG. 9 is a schematic diagram after the film 170 is adhered to the touch pad 140 (see FIG. 7) according to an embodiment of the present disclosure. FIG. 10 is a schematic diagram showing a situation in which the film 170 is adhered inaccurately according to an embodiment of the present disclosure. Referring first to FIG. 9, when the film 170 is adhered accurately on the front surface 144 of the touch pad 140, the process of adhering the film 170 is finished, and the positioning frame 100 can be removed along a direction 330. Referring to FIG. 10, if the assembly worker adheres the film 170 to the front surface 144 of the touch pad 140 without correctly aligning the film 170 with the opening 120 of the positioning frame 100, the film 170 will be adhered inaccurately. Because the area of the opening 120 of the positioning frame 100 is approximately the same as the area of the film 170, if the film 170 is adhered inaccurately, at least a part 172 of the film 170 is adhered to the main frame 101 or may even be adhered to the front cover of the system body 150. At this time, the assembly worker can be easily aware of such inaccurate adhering and can immediately re-adhere the film 170. Even if the part 172 adhered to the main frame 101 is extremely small and therefore not easily noticed, the part 172 of the film 170 is removed while removing the positioning frame 100 from the front surface 144 of the touch pad 140, such that the assembly worker can remove the remainder of the film 170 easily. The assembly worker subsequently repeats the steps described above until the adhering process is finished.

Accordingly, through the positioning frame and method for adhering a film to a touch pad of this disclosure, the film is constrained on the front surface of the touch pad, so as to solve the prior art problems caused by variations in physical dimensions due to the tolerance elements. In addition, the assembly worker can see the front surface of the front cover of the system body and the front surface of the touch pad during assembly. When the assembly worker adheres the film inaccurately, the assembly worker can easily notice this fact, and then proceed to immediately rectify the situation (i.e., re-adhere the film). In addition, the positioning frame of this disclosure may be manufactured cheaply, and is effective in assembling the touch pad. Finally, the positioning frame and method for adhering a film to a touch pad and the positioning frame of this disclosure can be used in an automatic manufacturing process, so as to minimize labor costs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A positioning system, comprising:
   a positioning frame comprising a main frame and a positioning wall, the positioning wall being connected to a side of the main frame, extending away from the side, and protruding beyond the main frame, the main frame having a first inner surface, the positioning wall having a second inner surface, the first inner surface and the second inner surface being on the same plane and defining an opening; and
   an electronic device comprising a touch pad, wherein an area of the opening is approximately the same as an area of a film to be adhered to the touch pad, and the positioning wall is configured to be inserted into a gap between the touch pad and a front cover of a system body.
2. The positioning system of claim 1, wherein the gap has a width, the positioning wall has a thickness, and the thickness is smaller than the width.
3. The positioning system of claim 1, wherein the main frame and the positioning wall are rectangular.
4. The positioning system of claim 1, wherein the main frame and the positioning wall are made of metal.
5. The positioning system of claim 1, wherein the main frame has a uniform height.
6. The positioning system of claim 5, wherein a part of the positioning wall has another uniform height.

* * * * *